(12) United States Patent
Herrero

(10) Patent No.: US 11,647,012 B2
(45) Date of Patent: May 9, 2023

(54) BIRTH PRIVATE-KEY BASED SECURITY FOR REST API IN IOT DEVICES

(71) Applicant: Johnson Controls Tyco IP Holdings LLP, Milwaukee, WI (US)

(72) Inventor: Rolando Herrero, Boca Raton, FL (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 17/214,473

(22) Filed: Mar. 26, 2021

(65) Prior Publication Data

US 2022/0311624 A1 Sep. 29, 2022

(51) Int. Cl.
| | |
|---|---|
| H04L 29/06 | (2006.01) |
| H04L 9/40 | (2022.01) |
| H04L 9/32 | (2006.01) |
| G16Y 30/10 | (2020.01) |
| G16Y 10/75 | (2020.01) |
| H04L 9/30 | (2006.01) |

(52) U.S. Cl.
CPC .......... H04L 63/0823 (2013.01); G16Y 10/75 (2020.01); G16Y 30/10 (2020.01); H04L 9/30 (2013.01); H04L 9/3215 (2013.01); H04L 9/3239 (2013.01); H04L 9/3268 (2013.01); H04L 63/0869 (2013.01); H04L 63/166 (2013.01)

(58) Field of Classification Search
CPC .................................................. H04L 63/0823
See application file for complete search history.

(56) References Cited

U.S. PATENT DOCUMENTS

| | | | |
|---|---|---|---|
| 2017/0200225 A1* | 7/2017 | Kanungo | H04L 9/0825 |
| 2020/0330886 A1* | 10/2020 | Kelliher | A63H 19/30 |
| 2021/0152373 A1* | 5/2021 | Gulati | G06F 21/57 |
| 2021/0392604 A1* | 12/2021 | Deshmukh | H04B 7/155 |

* cited by examiner

*Primary Examiner* — Bradley W Holder
(74) *Attorney, Agent, or Firm* — ArentFox Schiff LLP

(57) ABSTRACT

A system may be configured to perform secure low-latency and low-throughput support of REST APIs in IoT devices. In some aspects, the system may establish a first encrypted communication channel with an application of a management device, receive a certificate signing request including a public key of the application via the private channel, sign the public key of the application using read-only birth secret information to generate first signed certificate, and transmit the first signed certificate vis the private channel. Further, the system may receive an authentication request including a second signed certificate via a second encrypted communication channel, determine that the second signed certificate matches the first signed certificate via the read-only birth secret information, and transmit an application credential to the application via the second encrypted communication channel.

20 Claims, 9 Drawing Sheets

BIRTH PRIVATE-KEY BASED SECURITY FOR REST API IN IOT DEVICES

CROSS REFERENCE TO RELATED APPLICATIONS

This application is related to co-pending U.S. patent application Ser. No. 17/214,468, by Rolando Herrero, entitled "SECURE LOW-LATENCY AND LOW-THROUGHPUT SUPPORT OF REST API IN IOT DEVICES," filed on Mar. 26, 2021, which is hereby incorporated by reference in its entirety.

FIELD OF TECHNOLOGY

The present disclosure relates generally to internet of thing (IoT) devices, and more particularly, to methods and systems for secure low-latency and low-throughput support of representational state transfer (REST) application programming interface (API) in IoT devices.

BACKGROUND

REST APIs are often employed for communications between applications and IoT devices. In some examples, applications acting as clients issue REST requests to retrieve configuration, sensor and actuation data, and the IoT devices respond by transmitting REST responses. Typically, REST interaction with an IoT device, requires an application to authenticate using credentials having corresponding credential information stored in a database of the IoT device, and transmit a chain of response-induced requests. However, databases are vulnerable to hacking and are unable to maintain their contents during factory resets and other servicing operations. Further, relying on chain of response-induced requests increases the latency of REST interactions between an IoT device and an application.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure provides systems, apparatuses, and methods for secure low-latency and low-throughput support of REST APIs in IoT devices. These systems, methods, and apparatuses will be described in the following detailed description and illustrated in the accompanying drawings by various modules, blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In an aspect, a method for secure low-latency and low-throughput support of REST APIs in IoT devices may comprise establishing a first encrypted communication channel with an application of a management device; receiving, from the application via the first encrypted communication channel, a certificate signing request including a public key of the application; signing, using read-only birth secret information of the IoT device, the public key of the application to generate a first signed certificate; transmitting, to the application via the first encrypted communication channel, the first signed certificate in response to the certificate signing request; receiving, via a second encrypted communication channel, an authentication request including a second signed certificate; determining, via the read-only birth secret information, that the second signed certificate matches the first signed certificate; and transmitting an application credential to the application via the second encrypted communication channel.

In another aspect, a system for secure low-latency and low-throughput support of REST APIs in IoT devices may comprise a memory storing instructions, and at least one processor couple to the memory and configured by the instructions to establish a first encrypted communication channel with an application; receive, from the application via the first encrypted communication channel, a certificate signing request including a public key of the application; sign, using read-only birth secret information of the IoT device, the public key of the application to generate a first signed certificate; transmit, to the application via the first encrypted communication channel, the first signed certificate in response to the certificate signing request; receive, via a second encrypted communication channel, an authentication request including a second signed certificate; determine, via the read-only birth secret information, that the second signed certificate matches the first signed certificate; and transmit an application credential to the application via the second encrypted communication channel.

In another aspect, a non-transitory computer-readable medium storing instructions that cause a processor to establish a first encrypted communication channel with an application; receive, from the application via the first encrypted communication channel, a certificate signing request including a public key of the application; sign, using read-only birth secret information of the IoT device, the public key of the application to generate a first signed certificate; transmit, to the application via the first encrypted communication channel, the first signed certificate in response to the certificate signing request; receive, via a second encrypted communication channel, an authentication request including a second signed certificate; determine, via the read-only birth secret information, that the second signed certificate matches the first signed certificate; and transmit an application credential to the application via the second encrypted communication channel.

In another aspect, a method for secure low-latency and low-throughput support of REST APIs in IoT devices may comprise transmitting, by an application to an IoT device, a REST request including a parameter and an application authentication credential for authenticating to the IoT device; determining, based on an expected REST response to the actual REST request, one or more conditional parameters for configuring the IoT device; transmitting, without waiting for the expected REST response, a predictive REST request including the one or more conditional parameters; and receiving an actual response indicating success of the configuring the IoT device.

In another aspect, a system for secure low-latency and low-throughput support of REST APIs in IoT devices may comprise a memory storing instructions, and at least one processor couple to the memory and configured by the instructions to determine, by an object detection component configured to detect objects within a region of interest, a candidate object within the region of interest in a current video frame; determine that the candidate object is a detected object based at least in part on comparing an attribute value of the candidate object to historic attribute information determined during a plurality of previous video frames; determine, by an object tracker component configured to track movement of the objects within the region of interest, a boundary representation corresponding to the detected object; and determine, based on the boundary representation, an object count representing a number of the objects that have entered the region of interest and/or a number of the objects that have exited the region of interest.

In another aspect, a non-transitory computer-readable medium storing instructions that cause a processor to determine, by an object detection component configured to detect objects within a region of interest, a candidate object within the region of interest in a current video frame; determine that the candidate object is a detected object based at least in part on comparing an attribute value of the candidate object to historic attribute information determined during a plurality of previous video frames; determine, by an object tracker component configured to track movement of the objects within the region of interest, a boundary representation corresponding to the detected object; and determine, based on the boundary representation, an object count representing a number of the objects that have entered the region of interest and/or a number of the objects that have exited the region of interest.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
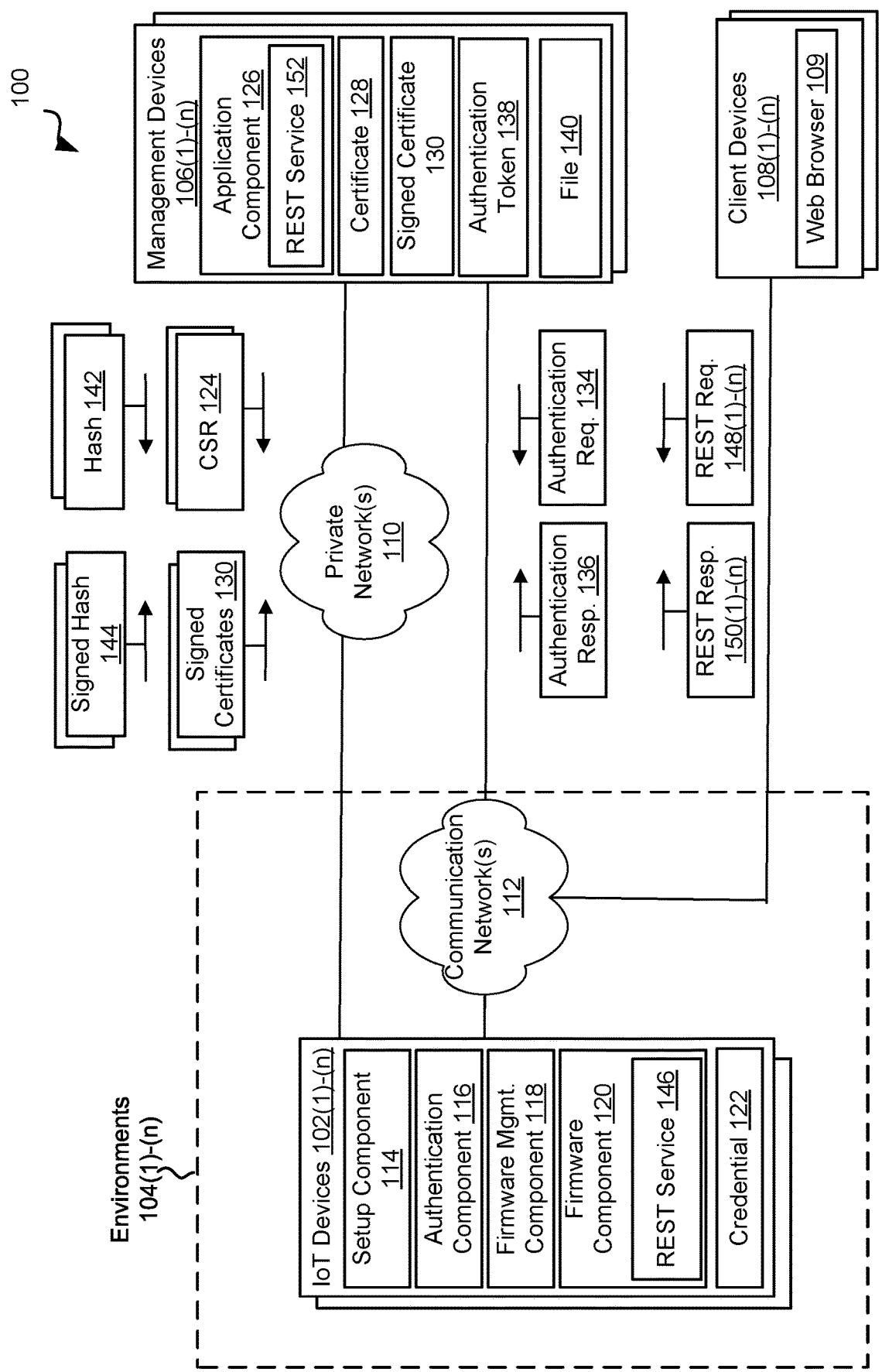
FIG. 1 is a block diagram of an example of a system for secure low-latency and low-throughput support of REST APIs in IoT devices, according to some implementations.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Implementations of the present disclosure provide systems, methods, and apparatuses that provide secure low-latency and low-throughput support of REST APIs in IoT devices. These systems, methods, and apparatuses will be described in the following detailed description and illustrated in the accompanying drawings by various modules, blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

In some implementations, one or more problems solved by the present solution are credential vulnerability, credential impermanence, high latency, and inefficient throughput in REST APIs on IoT devices. For example, this present disclosure describes systems and methods for secure low-latency and low-throughput support of REST APIs in IoT devices configured to sign a certificate associated with an application using a birth private key of an IoT device to generate a signed certificate. The signed certificate may then be presented to the IoT device for the authentication purposes and verified without use of a database. As such, the present solution removes the need to rely on databases to store credentials and the need for the application to re-register with the IoT device after a factory reset or corruption of the file system of the IoT device. In addition, the present disclosure describes systems and methods for secure low-latency and low-throughput support of REST APIs in IoT devices configured to transmit a REST request including conditional parameters instead of waiting to receive a response from which to derive the parameters for the REST request. As such, the present solution addresses head-of-line blocking, dramatically lowers latency, reduces overall network throughput, and improves channel use efficiency.

Referring to FIG. 1, in one non-limiting aspect, a system 100 may be configured to provide secure low-latency and low-throughput support of REST APIs in IoT devices. As illustrated in FIG. 1, the system 100 may include one or more IoT devices 102(1)-(n) each deployed in an environment 104 of a plurality of environments 104(1)-(n), one or more management devices 106(1)-(n) configured to manage the IoT devices 102(1)-(n), one or more client devices 108(1)-(n) each including a web browser 109, one or more private networks 110, and one or more communication networks 112. In some aspects, each environment 104 may include one or more IoT devices 102. Further, the management devices 108(1)-(n) may be utilized by service persons to repair and/or manage the IoT devices 102(1)-(n). Further, the IoT devices 102(1)-(n) and the management devices 106(1)-(n) may communicate via the private network 110, and the IoT devices 102(1)-(n), the management devices 106(1)-(n), and the client devices 108(1)-(n) may communicate via the communication network 112. In some implementations, the private network 110 may include one or more of a wired and/or wireless private network. In some implementations, the communication network 112 may include one or more of a wired and/or wireless private network, personal area network, local area network, wide area network, or the Internet.

As used herein, in some aspects, the "internet of things" may refer to the interconnectivity of identifiable devices via the Internet. Some examples of the IoT devices 102(1)-(n) may include meters (e.g., a utility meter, a parking meter, etc.), sensors (e.g., a temperature sensor, an accelerometer, a heat sensor, a motion detector, etc.), readable tags, cameras, antennae, or any other device that can collect, obtain, and/or generate data and forward the data.

In some aspects, the IoT device 102 may include a setup component 114, an authentication component 116, a firmware management component 118, a firmware component 120, and a credential 122. The setup component 114 may be configured to generate signed certificates for the management devices 106(1)-(n). For example, the setup component 114 may perform mutual authentication with a management device 106 and establish an encrypted channel with the management device 106 over the private network 110, during a configuration process of the IoT device 102 and/or management device 106. In some aspects, access to the private network 110 may be restricted to a controlled environment with heightened security requirements. For example, the private network 110 may only be accessible at a manufacturing or servicing location of the IoT devices 102(1)-(n) as opposed to a location deployment of the IoT devices 102 within the environments 104(1)-(n). In some aspects, the encrypted channel may be established using transport layer security (TLS) protocols in order to prevent man in the middle attacks.

In addition, the setup component 114 may receive a certificate signing request (CSR) 124 from an application component 126 of the management device 106 via the encrypted channel of the private network 110. The CSR 124 may include a certificate 128 or other authentication credential associated with the management device 106. Further, in some aspects, the CSR 124 may be transmitted to the setup component as a REST parameter encoded as a multiple type-length-value attribute. Upon receipt of the CSR 124, the setup component 114 may identify a public key within the certificate 128, and sign the public key of the certificate 128 of the management device 106, using the credential 122 (e.g., a birth private key of the credential 122), to generate the signed certificate 130. In some aspects, the credential 122 may be a birth certificate including birth private and public keys. As used herein, in some aspects, a "birth certificate" may refer to a read-only digital certificate embedded, during manufacturing of a device, in a secure memory of the IoT device that cannot be tampered with and/or illegally accessed by unauthorized users. Further, the setup component 114 may transmit the signed certificate 130 to the management device 106 via the encrypted channel of the private network 110. In some aspects, the setup component 114 may transmit the signed certificate as an encoded REST parameter in a privacy enhanced mail format.

The authentication component 116 may be configured to authenticate management devices 106(1)-(n) possessing the signed certificates 130. For example, a service person may endeavor to service the IoT device 102 within the environment 104 via the management device 106(1). As such, the authentication component 116 may perform mutual authentication with the management device 106, and establish an encrypted channel with the management device 106 over the communication network 112 (e.g., a direct wired connection between the IoT device 102 and the management device 106), in response to user input from the service person at the management device 106. Further, the authentication component 116 may receive an authentication request 134 including an authentication credential from the management device 106 via the encrypted channel over the communication network 112. Upon receipt of the authentication request 134, the authentication component 116 may authenticate the management device 106 by verifying whether the authentication credential is the signed certificate 130 using the credential 122 (e.g., a public key of the credential 122). If the authentication component 116 verifies that the authentication request 134 includes a signed certificate 130 signed using the credential 122, the authentication component 116 may transmit an authentication response 136 including an authentication token 138. Consequently, employing the setup component 114 and authentication component 116 eliminates the need for a certificate authority for signing credentials, and a database storing credentials of the management devices 106(1)-(n). For example, the IoT device 102 will be capable of authenticating management devices 106 previously-issued signed certificates after a factory reset, as only the credential 122 is needed to verify the previously-issued signed certificates. This offers a marked improvement over conventional techniques that stored credentials in databases that are deleted during factory resets and consequently unable to access the deleted credentials to authenticate previously-credentialed devices.

The firmware management component 118 may be configured to authenticate one or more files 140(1)-(n) (e.g., an installation file). For example, an administrator may endeavor to generate an installation file for an IoT device 102 via the management device 106. As such, the firmware management component 118 may perform mutual authentication with the management device 106, and establish an encrypted channel with the management device 106 over the private network 110, during a configuration process of the IoT device 102. Further, the firmware management component 118 may receive a hash 142 of a file 140 via the encrypted channel of the private network 110. Upon receipt of the hash 142 of the file 140, the firmware management component 118 may sign the hash 142 using the credential 122 (e.g., a private key of the credential 122) to generate the signed hash 144, and transmit the signed hash 144 to the management device 106 via the encrypted channel of the private network 110. In some aspects, the firmware management component 118 may employ message-digest algorithm (MD5), secure hash algorithm (SHA), or another hash function to sign the hash 142 of the file 140 to generate the signed hash 144.

Further, the firmware management component 118 may receive an authentication request 134 from a web browser 109 of a client device 108. In some aspects, the authentication request 134 may include the file 140 and the signed hash 144. Upon receipt of the authentication request 134, the firmware management component 118 may verify the file 140 via the signed hash 144 using the credential 122 (e.g., the public key of the credential 122). If the firmware management component 118 verifies the file 140, the firmware management component 118 may install or deploy the file 140. Additionally, the authentication component 116 may transmit an authentication response 136 including a verification result. In some aspects, installation or deployment of the file 140 may modify the firmware component 120.

The firmware component 120 may be configured to operate the IoT device 102. For example, the firmware component 120 may be configured to manage data collection by the IoT device 102, and data transfer by the IoT device 102. In some aspects, the firmware component 120 may provide sensor logic, meter logic, camera logic, telecommunications logic, etc. Further the firmware component 120 may include a REST service 146 for performing REST operations (e.g., GET, POST, PUT, PATCH, and DELETE). As described herein, the REST service 146 may be configured to transmit predictive requests and non-predictive requests to the management devices 106(1)-(n), and receive predictive requests and non-predictive requests from the management devices 106(1)-(n). As used herein, a "predictive request" may refer to a request including one or more conditional parameters that are selected based on an expected but not yet received communication from a communication partner. As used herein, a "non-predictive request" may refer to a request including one or more parameters that are selected based on a received communication from a communication partner or independent of any received communications.

For example, the REST service 146 may be configured to transmit REST requests 148(1)-(n) and REST responses 150(1)-(n) to management device 106(1)-(n), and receive REST requests and REST responses 150(1)-(n) from the management devices 106(1)-(n). In some aspects, the REST requests 148(1)-(n) and the REST responses 150(1)-(n) may be used to configure real-time protocol (RTP) communications between an application component 126 of the management device 106 and the IoT device 102, configure a number of levels for alarm generation by the IoT device 102 and/or threshold values for alarm generation by the IoT device 102, and/or configure a type of sensor functionality of the IoT device 102.

As an example, a REST workflow at the REST service 146 may include receiving a first REST request 148(1) from the management device 106, responding with a first REST response 150(1) to the management device 106, receiving a second REST request 150(2) from the management device 106, and responding with the second REST response 150(2). Further, the second REST request 148(2) may include parameters derived by the management device 106 from the first REST response 148(1). In some examples, the REST service 146 may be configured to receive the REST requests 148(1)-(2) in parallel even though the REST request 148(2) is dependent upon the response to the REST request 148(1). In particular, the REST request 148(2) may be a predictive request including one or more conditional parameters determined by the management device 106 based upon the expected contents of the REST response 148(1). For example, the REST first request 148(1) may request the RTC protocols supported by the IoT device 102, and the second REST request may request use of real-time protocol (RTP) as the RTC protocol via port 5100 with a 64 Kbps rate as a primary option and constrained application protocol (CoAP) as the RTC protocol via port 5210 with a 20 Kbps rate as the secondary option. Further, the REST service 146 may be configured to process the conditional parameters by skipping transmission of the REST response 150(1) to the REST request 148(1) when the conditional parameter is valid, or transmitting the REST response 150(1) when the conditional parameter is invalid. For example, if the management device 106 correctly predicts that the IoT device 102 supports RTP or COAP, the IoT device 102 may transmit the REST response 150(2) indicating successful configuration of the RTC protocol. If the management device 106 incorrectly predicts the supported RTC protocols, the IoT device 102 may transmit the REST response 150(1) identifying the RTC protocols supported by the IoT device 102.

In some aspects, parameters in GET operations may be encoded as follow: $parameter_1=value_1\&parameter_2=value_2 \ldots \&parameter_n=value_n$. Parameters in POST/PUT operations may be encoded as follows:

parameter$_1$=value$_1$&parameter$_2$=value$_2$ . . . &parameter$_n$=value$_n$. Additionally, or alternatively, sets of parameter=value pairs can be individually included in the request bodies as part of POST/PUT requests. In some aspects, a conditional parameter operator (e.g., "#") may be embedded in a parameter name to identify conditional parameters. For example, a GET request with conditional parameters may be encoded as follows: parameter$_1$#condition$_{1,1}$=value$_{1,1}$&parameter$_1$#condition$_{1,2}$=value$_{1,2}$&parameter$_2$#condition$_{2,1}$=value$_{2,1}$ . . . &parameter$_{n,i}$#condition$_{n,1}$=value$_{n,i}$. As another example, conditional parameters in POST/PUT operations may be encoded as follows: parameter$_1$#condition$_{1,1}$=value$_{1,1}$&parameter$_1$#condition$_{1,2}$=value$_{1,2}$&parameter$_2$#condition$_{2,1}$=value$_{2,1}$ . . . &parameter$_{n,i}$#condition$_{n,i}$=value$_n$. Additionally, or alternatively, sets of parameter#condition=value pairs can be individually included in the request bodies as part of POST/PUT requests.

In additional, the REST service 146 may be configured to determine conditional parameters for predictive requests, and transmit the predictive requests. In some aspects, the REST service 146 may determine the conditional parameters by minimizing the set of available parameter options. In some aspects, the REST service 146 may minimize the set of available parameters by excluding parameters corresponding to features and/or functionalities that are incompatible with the IoT device 102 and/or the management device 106. For example, if an expected response queries for the selection of a protocol, the REST service 146 may determine the conditional parameters based on the protocols implemented by the IoT device 102.

In some aspects, the REST service 146 may determine the conditional parameters based on historic information and/or one or more machine learning models. For example, the REST service 146 may determine the conditional parameters based upon a parameter previously requested by the IoT device 102 and/or previously accepted by the management device 106. As another example, the REST service 146 may determine the conditional parameters using a machine learning model based on the device attributes of the IoT device 102 and/or the management device 106. Some examples of device attributes include firmware, firmware version, available peripherals, installed applications, location, sensor data, usage history, available protocols. In some aspects, the REST service 146 may rank the conditional parameters to indicate a preference among the conditional parameters. For example, the REST service 146 may indicate that a first conditional parameter should be initially processed as a parameter submitted by the IoT device 102. If processing the first conditional parameter is unsuccessful, the management device 106 may consider other conditional parameters based on a corresponding priority or rank provided by the REST service 146.

In some aspects, the management device 106 may include an application component 126, a certificate 128, an IoT device signed certificate 132, one or more files 140(1)-(n), one or more hashes 142(1)-(n), and one or more signed hashes 144(1)-(n). The application component 126 may be configured to acquire signed certificates 130 for the management device 106. For example, the application component 126 may perform mutual authentication with an IoT device 102, and establish an encrypted channel with the IoT device 102 over the private network 110. In some aspects, access to the private network 110 may be restricted to a controlled environment with heightened security requirements. For example, the private network 110 may only be accessible at a manufacturing or a servicing location of the IoT devices 102(1)-(n). In some aspects, the encrypted channel may be established using TLS protocols in order to prevent man in the middle attacks.

In some aspects, the application component 126 may be configured to acquire a signed certificate 130 which enables the management device 106 to request the performance of REST operations at the IoT device 102. For example, the application component 126 may transmit the certificate signing request (CSR) 124 to the IoT device 102 via the encrypted channel of the private network 110. The CSR 124 may include the certificate 128. In response to transmission of the CSR 124, the application component 126 may receive the signed certificate 130 from the IoT device 102 via the encrypted channel of the private network 110. As described in detail herein, the signed certificate 130 may be signed using a birth private key of the IoT device 102.

Further, once the signed certificate 130 has been issued by the IoT device 102, the application component 126 may employ the signed certificate 130 to authenticate to IoT device 102. For example, the application component 126 may perform mutual authentication with the IoT device 102, and establish an encrypted channel with the IoT device 102 over the communication network 112. Further, the application component 126 may transmit the authentication request 134 including the signed certificate 130 via the encrypted channel over the communication network 112. If the management device 106 verifies that the authentication request 134 includes a signed certificate signed using the credential 122, the management device 106 may transmit an authentication response 136 including an authentication token 138. In some aspects, the application component 126 may employ the authentication token 138 to manage the IoT device 102. For example, the management device 106 may transmit REST requests 148(1)-(N) including the authentication token 138 to the IoT device 102, and the IoT device 102 may perform one or more configuration actions requested in the REST requests 148(1)-(N) based on the presence of the authentication token 138.

In some aspects, the application component 126 may facilitate the installation and/or deployment of the files 140(1)-(n) on the IoT device 102. For example, the application component 126 may perform mutual authentication with the IoT device 102, and establish an encrypted channel with the IoT device 102 over the communication network 112. Further, the application component 126 may generate a hash 142 of a file 140, and transmit the hash 142 to the IoT device 102 via the encrypted channel of the communication network 112. Upon receipt of the hash 142 of the file 140, the firmware management component 118 may sign the hash 142 using the credential 122 (e.g., a private key of the credential 122), and transmit the signed hash 144 to the application component 126 via the encrypted channel of the communication network 112. As described in detail herein, the file 140 and signed hash 144 may be provided to the client device 108(1)-(n), which may install or deploy the file 140 using the signed hash 144 as an authentication credential. In some aspects, installation or deployment of the file 140 may modify the firmware component 120 of the IoT device 102.

Further, the file 140 and the signed hash 144 may later be presented to the application component 126 to modify the IoT device 102, e.g., reinstall the firmware component 120, reconfigure the IoT device 102, etc. For example, the application component 126 may transmit an authentication request 134 including the file 140 and the signed hash 144. Upon receipt of the authentication request 134, the IoT device 102 may verify the file 140 via the signed hash 144 using the credential 122. If the IoT device 102 verifies the file 140, the IoT device 102 may install or deploy the file 140. Additionally, the IoT device 102 may transmit the authentication response 136 including a verification result to the management device 106. In some aspects, installation or deployment of the file 140 may modify the firmware component 120 of the IoT device 102.

Further, as illustrated in FIG. 1, the application component 126 may include a REST service 152 configured to transmit predictive requests and non-predictive requests to the IoT device 102, and receive predictive requests and non-predictive requests from the IoT devices 102(1)-(n). For example, the REST service 152 may be configured to transmit REST requests 148(1)-(n) and REST responses 150(1)-(n) to the IoT devices 102(1)-(n), and receive REST requests 148(1)-(n) and REST responses 150(1)-(n) from the IoT devices 102(1)-(n). Additionally, the REST requests 148(1)-(n) and the REST responses 150(1)-(n) may be used to configure RTP communications between an application component 126 of the management device 106 and the IoT device 102, configure a number of levels for alarm generation by the IoT device 102 and/or threshold values for alarm generation by the IoT device 102, and/or configure a type of sensor functionality of the IoT device 102. Further, in some aspects, a REST request 148 may be a predictive request.

As an example, a REST workflow at the REST service 152 may include transmitting a first REST request 148(1) to the IoT device 102, receiving a first REST response 150(1) from the IoT device 102, transmitting a second REST request 150(2) to the IoT device 102, and receiving the second REST response 150(2). Further, the second REST request 148(2) may include parameters derived from the first REST response 148(1). In some examples, the REST service 152 may be configured to transmit the REST requests 148(1)-(2) in parallel even though the parameters of the REST request 148(2) are derived from the response to the REST request 148(1). In particular, the REST request 148(2) may be a predictive request including conditional parameters, and the application component 126 may determine the conditional parameters based upon the expected contents of the REST response 150(1). For example, the REST first request 148(1) may request the RTC protocols supported by the IoT device 102, and the second REST request may request use of real-time protocol (RTP) as the RTC protocol via port 5100 with a 64 Kbps rate as a primary option, and constrained application protocol (CoAP) as the RTC protocol via port 5210 with a 20 Kbps rate as the secondary option. In some examples, the conditional parameters may be presented as shown in Table 1 below.

TABLE 1

| Conditional Parameters | |
|---|---|
| PARAMETER | VALUE |
| port#type==RTP | 5100 |
| port#type==CoAP | 5120 |
| rate#type==RTP | 64000 |
| rate#rype==CoAP | 20000 |

Further, the REST service 152 may receive the REST response 150(1) corresponding to the REST request 148(1) when the conditional parameter is invalid, or receive the REST response 150(2) corresponding to the REST requests 148(1)-(2) when the conditional parameter is valid. For example, if the management device 106 correctly predicts that the IoT device 102 supports RTP or COAP, the IoT device 102 may transmit the REST response 150(2) indicating successful configuration of the RTC protocol. If the management device 106 incorrectly predicts the supported RTC protocols, the IoT device 102 may transmit the REST response 150(1) identifying the RTC protocols supported by the IoT device 102.

In some aspects, the REST service 152 may determine the conditional parameters by minimizing the set of available parameter options. In some aspects, the REST service 152 may minimize the set of available parameters excluding parameters corresponding to features and/or functionalities that are incompatible with the IoT device 102 and/or the management device 106. For example, if an expected response queries for the selection of a protocol, the REST service 152 the conditional parameters may be derived from the protocols implemented by the IoT device 102. In some aspects, the REST service 152 may determine the conditional parameters based on historic information and/or one or more machine learning models. For example, the REST service 152 may determine the conditional parameters based upon a parameter previously requested by the management device 106 and/or previously accepted by the IoT device 102. As another example, the REST service 152 may determine the conditional parameters using a machine learning model based on the device attributes of the IoT device 102 and/or the management device 106. Some examples of device attributes include firmware, firmware version, available peripherals, installed applications, location, sensor data, usage history, available protocols, etc. In some aspects, the REST service 152 may rank the conditional parameters to indicate a preference among the conditional parameters. For example, the REST service 152 may indicate that a first conditional parameter should be initially processed as the selected parameter. If processing the first conditional parameter is unsuccessful, the IoT device 102 may consider other conditional parameters based on a corresponding priority or rank provided by the REST service 152.

Figure 2A:
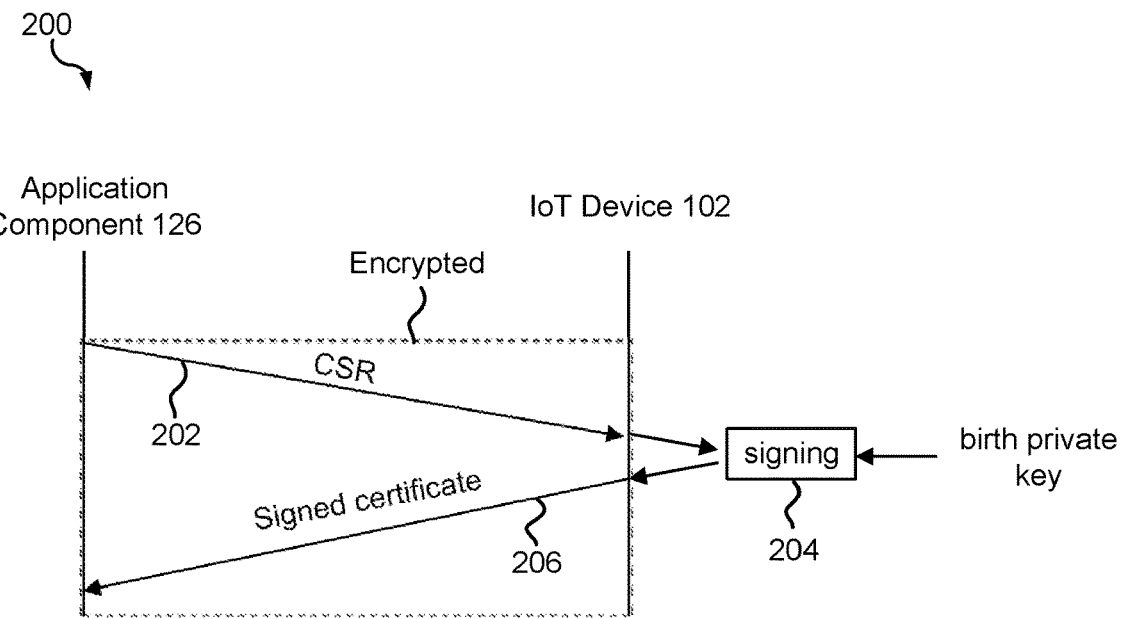
FIG. 2A is an example of generating a signed certificate, according to some implementations.

FIG. 2A is an example 200 of generating a signed certificate, according to some implementations. As illustrated in FIG. 2A, in some aspects, the application component 126 of the management device 106 and the IoT device 102 may establish a standard encrypted channel using a secure communications protocol (e.g., TLS). Further, at step 202, the application component 126 may transmit the CSR 124 to the IoT device 102 over the encrypted channel. In addition, at step 204, the IoT device 102, acting as a certificate authority, may extract the public key of the application component 126 from the CSR 124, and sign the public key with the birth private key of the credential 122 of the IoT device 102. In addition, at step 206, the IoT device 102 may transmit the signed certificate 130 to the application component 126.

Figure 2B:
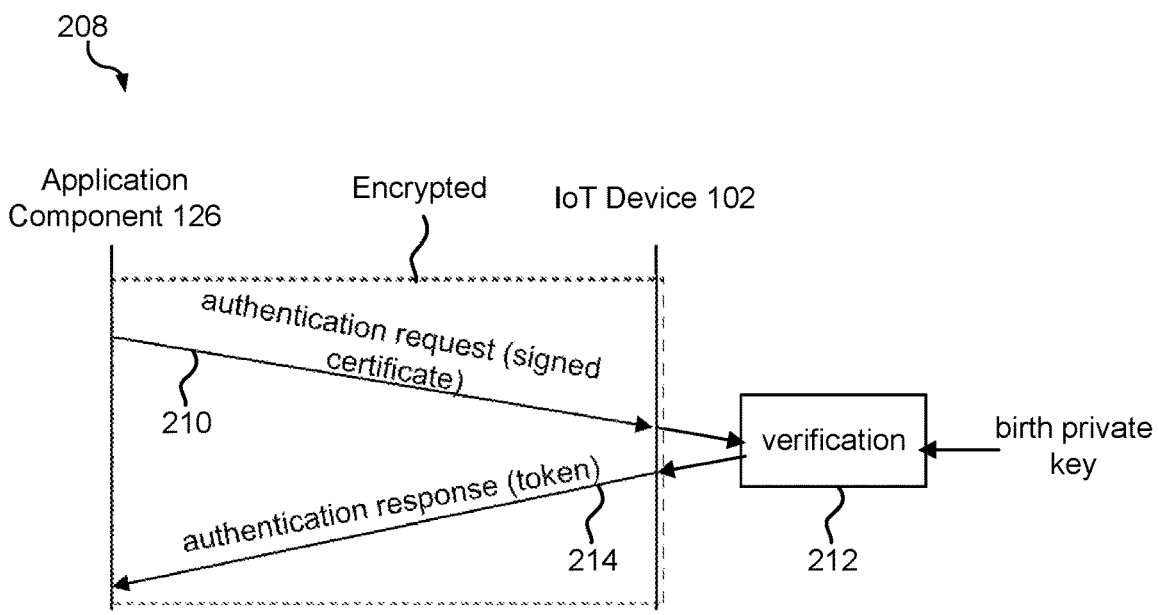
FIG. 2B is an example of utilizing a signed certificate, according to some implementations.

FIG. 2B is an example 208 of initiating a new REST session between an application and an IoT device, according to some implementations. As illustrated in FIG. 2B, in some aspects, the application component 126 of the management device 106 and the IoT device 102 may establish a standard encrypted channel using a secure communications protocol (e.g., TLS). Further, at step 210, the application component 126 may issue an initial authentication request 134 including a signed certificate 130. Additionally, at step 212, the IoT device 102 may validate the signed certificate 130 against the birth public key of the IoT Device 102. Further, at step 214, the IoT device 102 may issue an authentication response 136 that includes an authentication token 138 that identifies the session between the IoT device 102 and the management device 106.

Figure 3A:
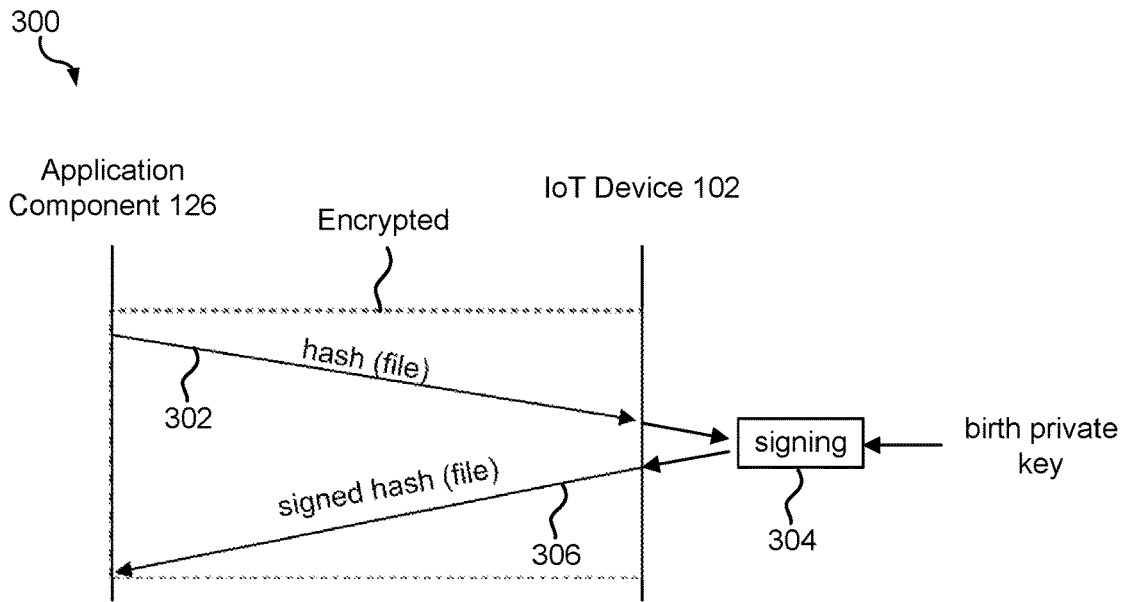
FIG. 3A illustrates an example of generating an authentication credential for a file, according to some implementations.

FIG. 3A illustrates an example 300 of generating an authentication credential for a file, according to some implementations. As illustrated in FIG. 3A, in some aspects, the application component 126 of the management device 106 and the IoT device 102 may establish a standard encrypted channel using a secure communications protocol (e.g., TLS). Further, at step 302, the application component 126 may calculate the hash 142 of the file 140 and transmit the hash 142 to the IoT device 102. In addition, at step 304, the IoT device 102 may sign the hash 142 with the birth private key of the IoT device 102. In addition, at step 306, transmit the signed hash 144 to the application component 126. Upon receipt of the signed hash 144, the application component 126 may attach the signed hash 144 to the file 140, e.g., compress them together in a single file.

Figure 3B:
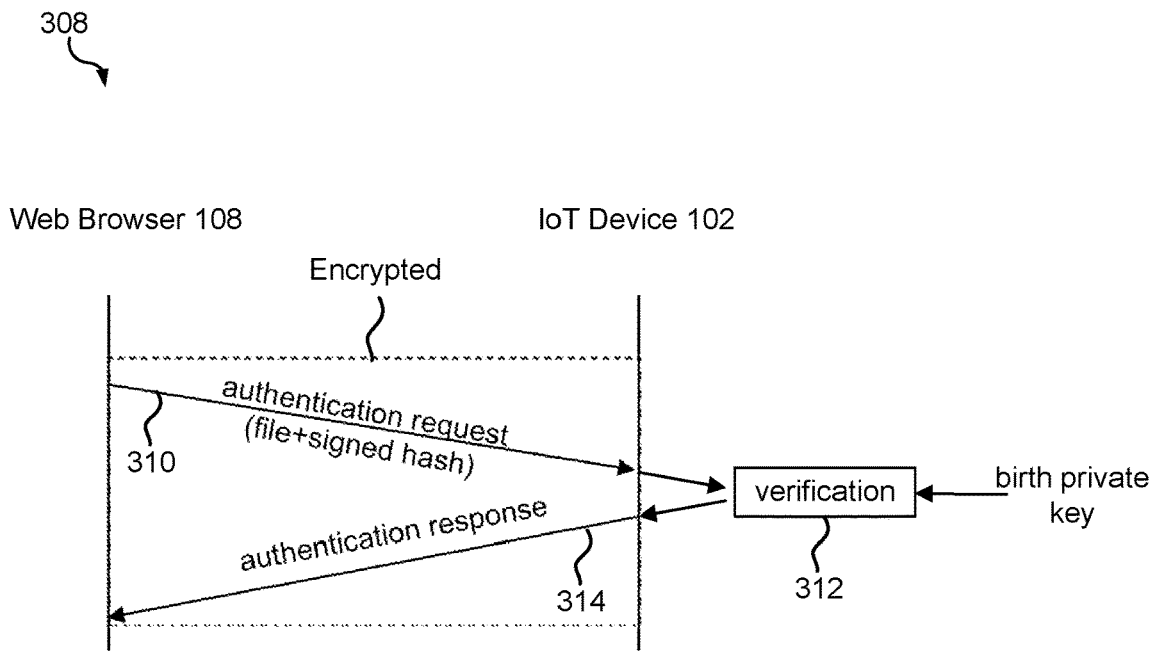
FIG. 3B illustrates an example of utilizing an authentication credential of a file, according to some implementations.

FIG. 3B illustrates an example 308 of utilizing an authentication credential of a file, according to some implementations. As illustrated in FIG. 3B, in some aspects, the web browser 109 of the client device 108 and the IoT device 102 may establish a standard encrypted channel using a secure communications protocol (e.g., TLS). Further, at step 310, the web browser 109 may transmit an authentication request 134 including the file 140 and the signed hash 144 to the IoT device 102. In addition, at step 312, the IoT device 102 may extract the signed hash 144, and generate a hash of the file 140, and verify that the signed hash 144 is valid and matches the generated hash. If validation is successful, the IoT device 102 may install or deploy the file 140. In addition, at step 314, the IoT device 102 transmit an authentication response 136 to the client device 108.

In some cases, the information of FIGS. 2A-2B and 3A-3B is transmitted as a REST parameter ("auth_info") encoded as multiple Type-Length-Value (TLV) attributes. In some specific but non-limiting aspects, a 2-byte TYPE field may specify the type of message, a 2-byte LENGTH field may specify the length of the VALUE field, and the variable length VALUE field may carry the payload of the message.

The following table specifies the messages and their payload meaning:

TABLE 2

Message Payloads

| Message Type | Length (bytes) | Payload |
| --- | --- | --- |
| CSR | Variable | CSR in PEM format |
| signed certificate | Variable | certificate in PEM format |
| authentication response | 2 | (0 = failure, 1 = authenticated, all other values are reserved) |

Once the application is authenticated, the authentication token 138 can be used for future transactions.

Figure 4A:
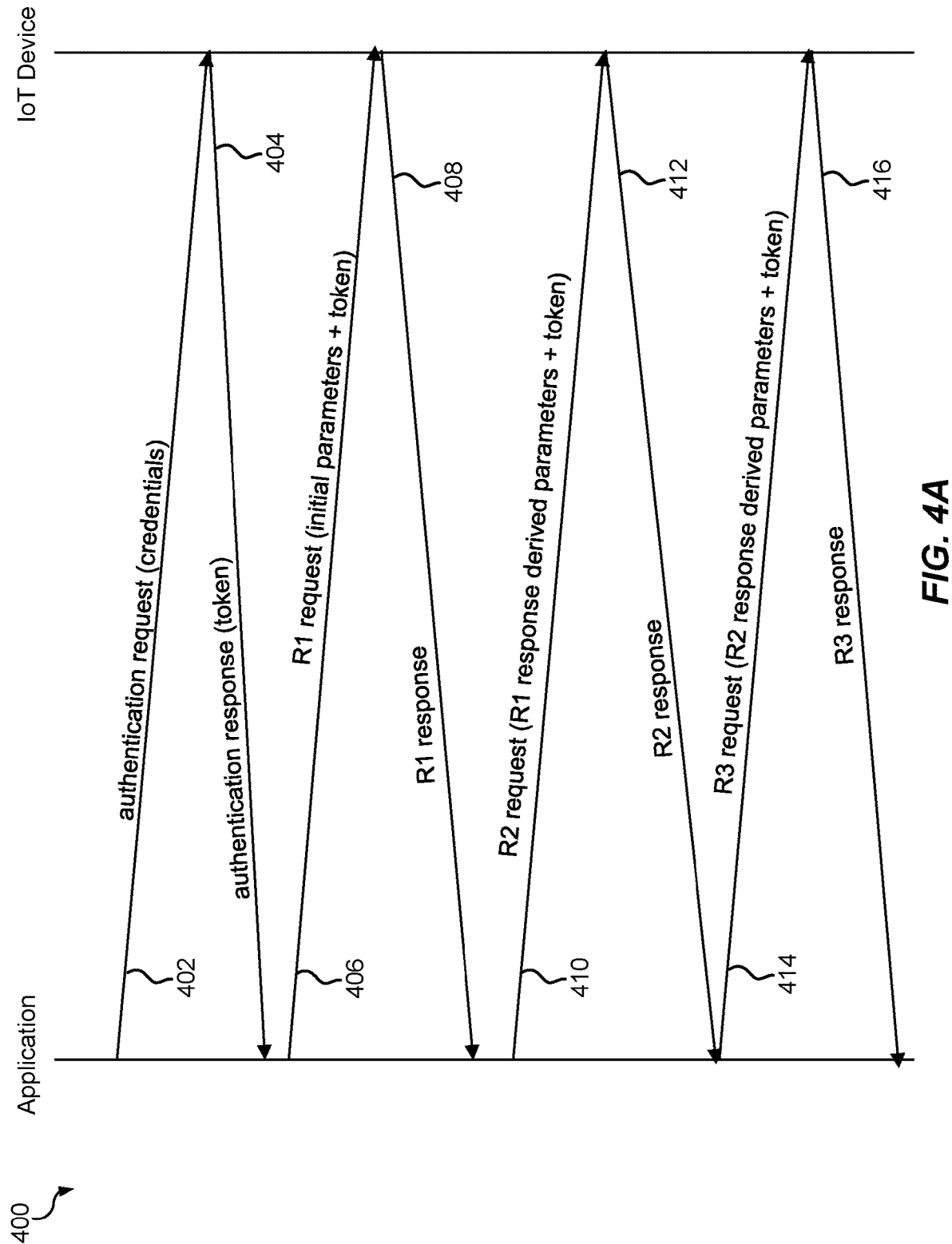
FIG. 4A illustrates an example REST interaction with non-prediction requests, according to some implementations.

FIG. 4A illustrates a first example REST interaction 400 with non-prediction requests, according to some implementations. As illustrated in FIG. 4A, at 402, an application may transmit an initial authentication REST request including a user identifier and password to an IoT device 102. Further, at 404, the IoT device 102 may validate the user name and password using a credential database, and transmit an authentication response that includes an authentication token that identifies the session. In addition, at 406, the application may transmit a first REST request that includes parameters and the authentication token. In some aspects, the authentication token may be included in the message to associate the REST request with the authenticated session. At 408, upon receipt of the first REST request, the IoT device may process the first REST request, generate a first REST response based on the processing, and transmit the first REST response to the application. Further, at 410, the application component 126 may transmit a second REST request that includes parameters derived from the first REST response, and the authentication token that is used to tie the REST requests to the session. At 412, upon receipt of second REST request, the IoT device 102 may process the second REST request, generate a second REST response, and transmit the second REST response to the application. Additionally, at 414, the application may generate the third REST request, which includes the authentication token and one or more parameters derived from the second REST response, and transmit the third REST request to the IoT device 102. At 416, upon receipt of third REST request, the IoT device 102 may process the third REST request, generate a third REST response, and transmit the third REST response to the application.

The REST interaction 400 between the application and the IoT device has several disadvantages. For example, the REST interaction of FIG. 4A employs credentials for application validation, which requires the IoT device 102 to maintain a database. Employing a database is a potential attack vector as it can be copied by hackers/intruders once they get physical access to the IoT device 102. In addition, if the file system of the IoT device 102 is corrupted or a factory reset is performed on the IoT device 102, the application will not be able authenticate against the IoT device 102 until the application credentials are manually re-added to the database. Further, the REST interaction 400 includes a chain of response-induced requests and responses that are susceptible to head of line blocking, which increase the latency of the scheme, e.g., the second REST request cannot be transmitted to the until the first REST response is received, the third REST request cannot be transmitted to the until the second REST response is received, etc.).

Figure 4B:
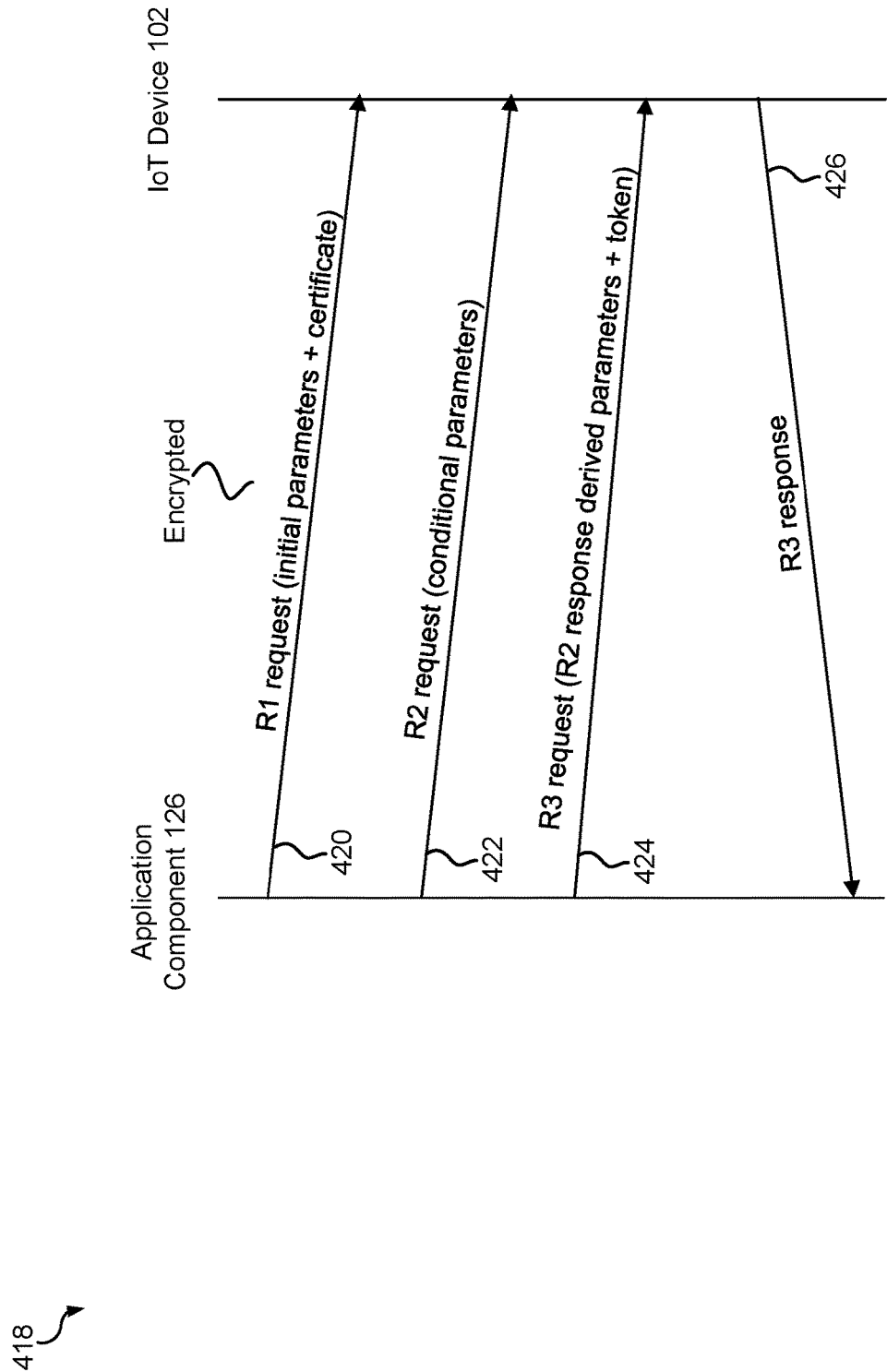
FIG. 4B illustrates a first example REST interaction with prediction requests, according to some implementations.

FIG. 413 illustrates a second example REST interaction 418 with prediction requests, according to some implementations. As illustrated in FIG. 4B, in some aspects, at step 420, the application component 126 of the management device 106 may transmit the first REST request 148(1) with a signed certificate 130 and parameters. In addition, at steps 422 and 424, the application component 126 may transmit the second REST request 148(2) with conditional parameters and the third REST request 148(3) with conditional parameters without waiting for receipt of the first REST response 150(1). Upon receipt of the first, second, and third REST requests 148(1)-(3), the IoT device 102 may verify the signed certificate 130 against the birth public key, and process the first, second, and third REST requests 148(1)-(3). At step 426, in some aspects, the IoT device 102 may generate an authentication token identifying the session based on the first REST request 148(1) and transmit the authentication token 138 to the application component within the third REST response 150(3).

When compared to the REST interaction 400, the REST interaction 418 is more efficient because the REST interaction 418 exhibits both lower latency and lower throughput. For example, the REST interaction 418 has lower latency because the propagation delay is minimized by reducing the number of messages to be transmitted and aggregating multiple messages into a single transaction. In addition the REST interaction 418 has lower throughput because fewer messages are transmitted.

Figure 4C:
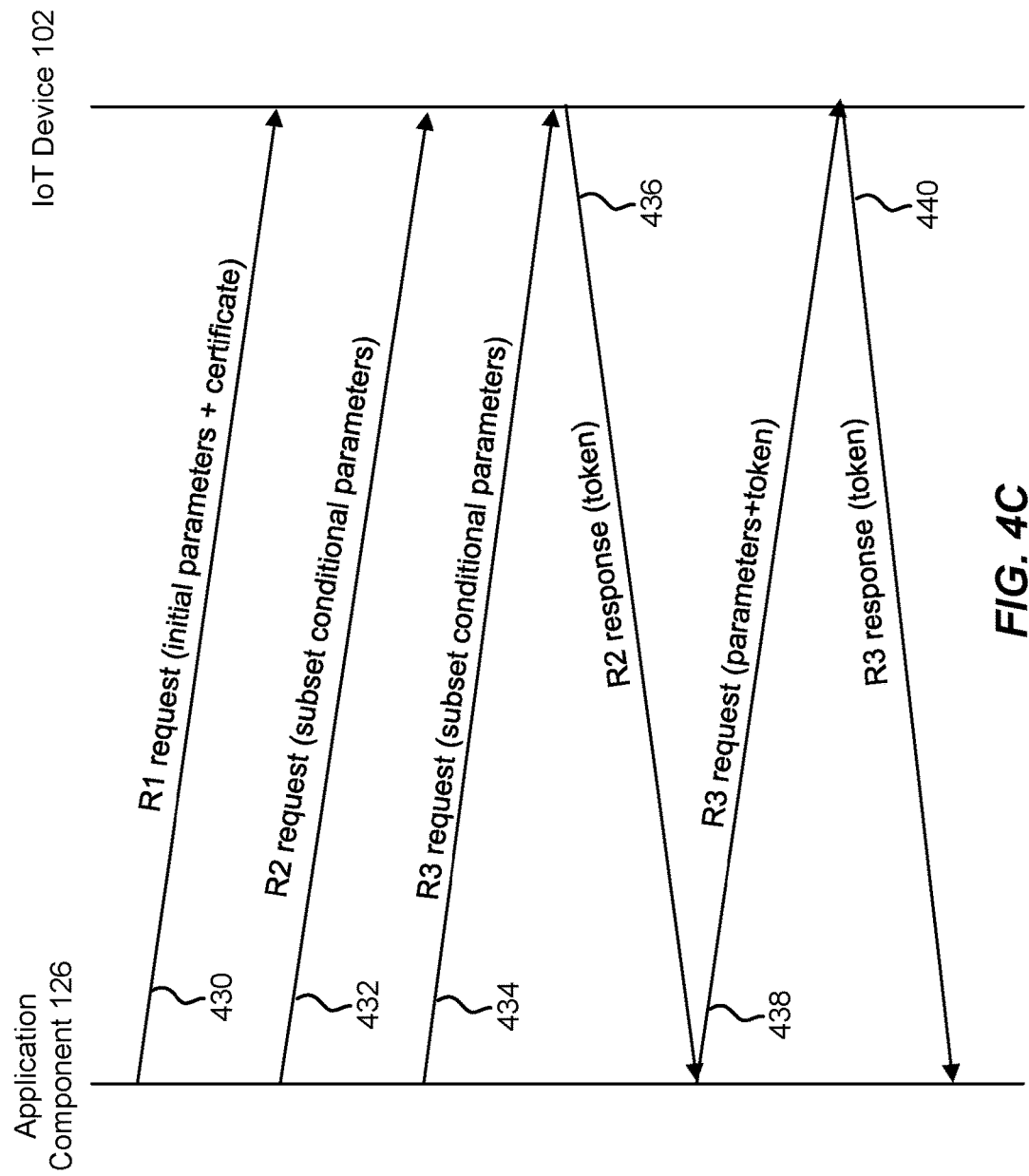
FIG. 4C illustrates a second example REST interaction with prediction requests, according to some implementations.

FIG. 4C illustrates a second example REST interaction 428 with prediction requests, according to some implementations. As illustrated in FIG. 4C, in some aspects, at step 430, the application component 126 of the management device 106 may transmit the first REST request 148(1) with a signed certificate 130 and parameters. In addition, at steps 432-434, the application component 126 may transmit the second REST request 148(2) with conditional parameters and the third REST request 148(3) with conditional parameters without waiting for receipt of the first REST response 150(1). Upon receipt of the first, second, and third REST requests 148(1)-(3), the IoT device 102 may verify the certificate against the birth public key, and process the first, second, and third REST requests 148(1)-(3). In some aspects, if the IoT device 102 fails to successfully process a predictive request (i.e., the second and third REST requests 148(2)-(3)), the IoT device 102 may send a REST response 150 to the last successful request.

For example, as illustrated in FIG. 4C, at step 436, the IoT device 102 may fail to successfully process the conditional parameters for the third REST request 148(3), and generate an authentication token 138 identifying the session based on the first REST request 148(1) and transmit the authentication token 138 to the application component 126 within the second REST response 150(2). At step 438, in response to receipt of the second REST response 150(2), the application component 126 may transmit another third REST request 148(3) with the authentication token 138 and parameters. At step 440, upon receipt of the third REST request 148(3), the IoT device 102 may process the third REST request 148(3), and transmit the third REST response 150(3) to the application component 126.

Figure 5:
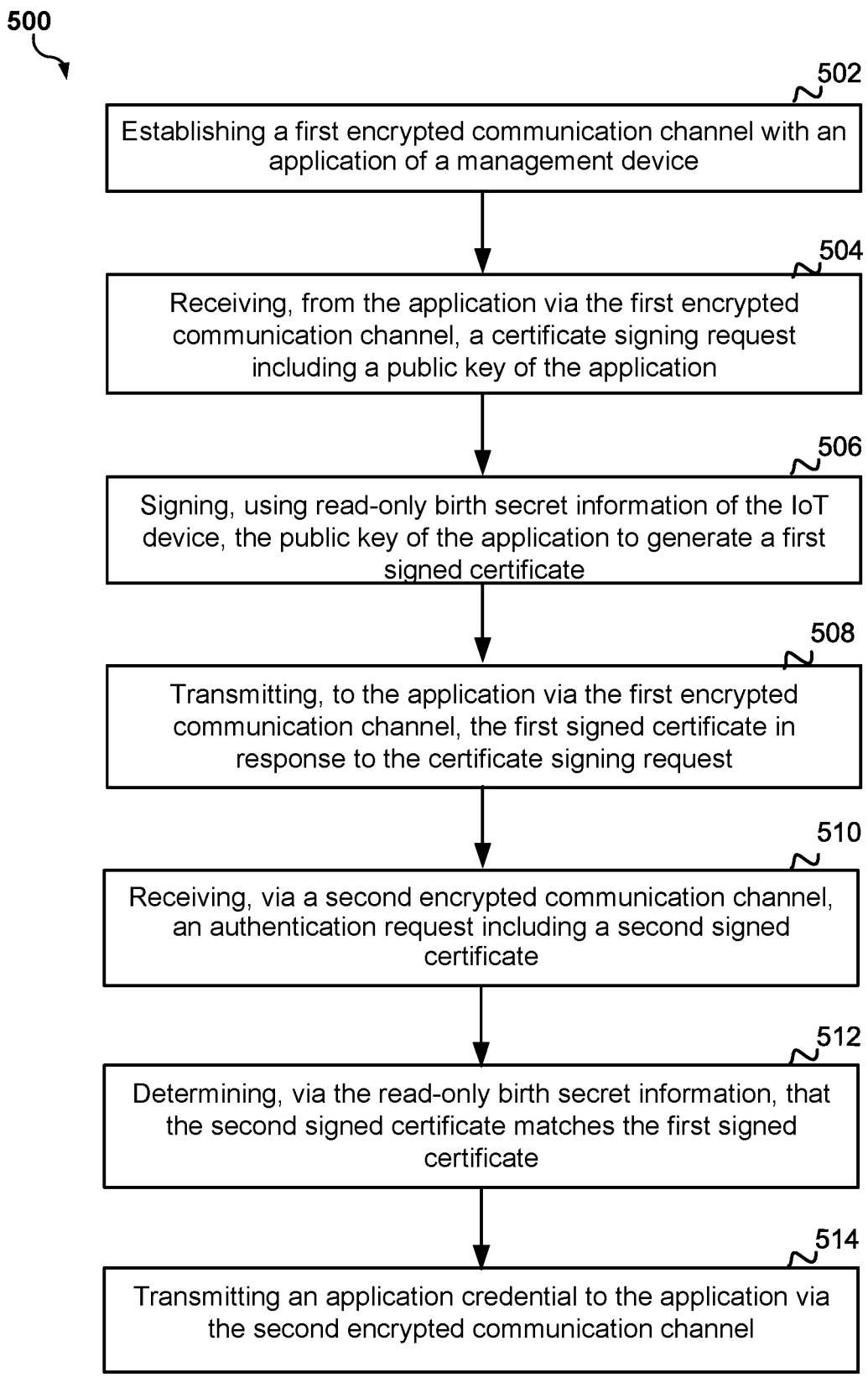
FIG. 5 is a flow diagram of an example method of employing a device signed certificate for secure low-latency and low-throughput support of REST APIs in IoT devices, according to some implementations.

Referring to FIG. 5, in operation, the IoT device 102 or computing device 700 may perform an example method 500 for employing a device signed certificate for secure low-latency and low-throughput support of REST APIs in IoT devices. The method 500 may be performed by one or more components of the IoT device 102, the computing device 700, or any device/component described herein according to the techniques described with reference to the previous figures.

At block 502, the method 500 includes establishing, by an IoT device, a first encrypted communication channel with an application of a management device. For example, the setup component 114 establish an encrypted channel with the application component 126 over the private network 110. Accordingly, the IoT device 102 or the processor 702 executing the setup component 114 may provide means for establishing a first encrypted communication channel with an application of a management device.

At block 504, the method 500 includes receiving, from the application via the first encrypted communication channel, a certificate signing request including a public key of the application. For example, the setup component 114 may receive the CSR 124 from the application component 126. Further, the CSR 124 may include a public key of the certificate 128. Accordingly, the IoT device 102 or the processor 702 executing the setup component 114 may provide means for receiving, from the application via the first encrypted communication channel, a certificate signing request including a public key of the application.

At block 506, the method 500 includes signing, using read-only birth secret information of the IoT device, the public key of the application to generate a first signed certificate. For example, the setup component 114 may sign the public key of the certificate 128 using the birth private key (i.e., the read-only birth secret information) of the credential 122. Accordingly, the IoT device 102 or the processor 702 executing the setup component 114 may provide means for signing, using read-only birth secret information of the IoT device, the public key of the application to generate a first signed certificate.

At block 508, the method 500 includes transmitting, to the application via the first encrypted communication channel, the first signed certificate in response to the certificate signing request. For example, the setup component 114 may transmit the signed certificate 130 to the application component 126. Accordingly, the IoT device 102 or the processor 702 executing the setup component 114 may provide means for transmitting, to the application via the first encrypted communication channel, the first signed certificate in response to the certificate signing request.

At block 510, the method 500 includes receiving, via a second encrypted communication channel, an authentication request including a second signed certificate. For example, the authentication component 116 may receive the authentication request 134. Further, the authentication request 134 may include the signed certificate 130. Accordingly, the IoT device 102 or the processor 702 executing the authentication component 116 may provide means for receiving, via a second encrypted communication channel, an authentication request including a second signed certificate.

At block 512, the method 500 includes determining, via the read-only birth secret information, that the second signed certificate matches the first signed certificate. For example, the authentication component 116 may employ the birth public key of the credential 122 to verify the signed certificate 130 within the authentication request 134. Accordingly, the IoT device 102 or the processor 702 executing the authentication component 116 may provide means for determining, via the read-only birth secret information, that the second signed certificate matches the first signed certificate.

At block 514, the method 500 includes transmitting an application credential to the application via the second encrypted communication channel. For example, the authentication component 116 may transmit an authentication response 136 including the authentication token 138. Accordingly, the IoT device 102 or the processor 702 executing the authentication component 116 may provide means for transmitting an application credential to the application via the second encrypted communication channel.

In an alternative or additional aspect, in order to establish a first encrypted communication channel with an application, the method 500 comprises establishing, via mutual authentication with the application, the first encrypted communication channel as a TLS session. Accordingly, the IoT device 102 or the processor 702 executing the setup component 114 may provide means for establishing, via mutual authentication with the application, the first encrypted communication channel as a TLS session. In an alternative or additional aspect, the read-only birth secret information includes a private key of the IoT device, and the method 500 comprises signing the public key of the application using the private key of the IoT device. Accordingly, the IoT device 102 or the processor 702 executing the setup component 114 may provide means for signing the public key of the application using the private key of the IoT device. In an alternative or additional aspect, the read-only birth secret information includes a private key of an IoT device, and the method 500 comprises verifying the second signed certificate using the public key of the IoT device. Accordingly, the IoT device 102 or the processor 702 executing the authentication component 116 may provide means for verifying the second signed certificate using the IoT device public key.

In an alternative or additional aspect, the application credential includes a session token and in order to transmit the application credential to the application, the method 500 comprises transmitting, to the application via the second encrypted communication channel, the session token for a REST session between the application and the IoT device. Accordingly, the IoT device 102 or the processor 702 executing the authentication component 116 may provide means for transmitting, to the application via the second encrypted communication channel, the session token for a REST session between the application and the IoT device.

In an alternative or additional aspect, in order to receive the certificate signing request including the public key of the application, and the method 500 comprises receiving a REST request with the public key of the application transmitted as a REST parameter encoded as a multiple type-length-value attribute. Accordingly, the IoT device 102 or the processor 702 executing the setup component 114 may provide means for receiving a REST request with the public key of the application transmitted as a REST parameter encoded as a multiple type-length-value attribute. In an alternative or additional aspect, in order to transmit the first signed certificate, and the method 500 comprises transmitting a REST response with the first signed certificate as an encoded REST parameter in a privacy enhanced mail format. Accordingly, the IoT device 102 or the processor 702 executing the setup component 114 may provide means for transmitting a REST response with the first signed certificate as an encoded REST parameter in a privacy enhanced mail format.

In an alternative or additional aspect, the method 500 comprises establishing a third encrypted communication channel with the application, receiving, via the third encrypted communication channel from an application, a hash of a first application file, signing, using the read-only birth secret information of the IoT device, the hash of the application file to generate a first signed hash, transmitting the first signed hash to the application via the third encrypted communication channel, establishing a fourth encrypted communication channel with a web browser, receiving an execution request including a second application file and a second signed hash, and executing, based on the first signed hash matching the second signed hash, an operation using the second application file. Accordingly, the IoT device 102 or the processor 702 executing the firmware management component 118 may provide means for establishing a third encrypted communication channel with the application, receiving, via the third encrypted communication channel from an application, a hash of a first application file, signing, using the read-only birth secret information of the IoT device, the hash of the application file to generate a first signed hash, transmitting the first signed hash to the application via the third encrypted communication channel, establishing a fourth encrypted communication channel with a web browser, receiving an execution request including a second application file and a second signed hash, and executing, based on the first signed hash matching the second signed hash, an operation using the second application file.

Figure 6:
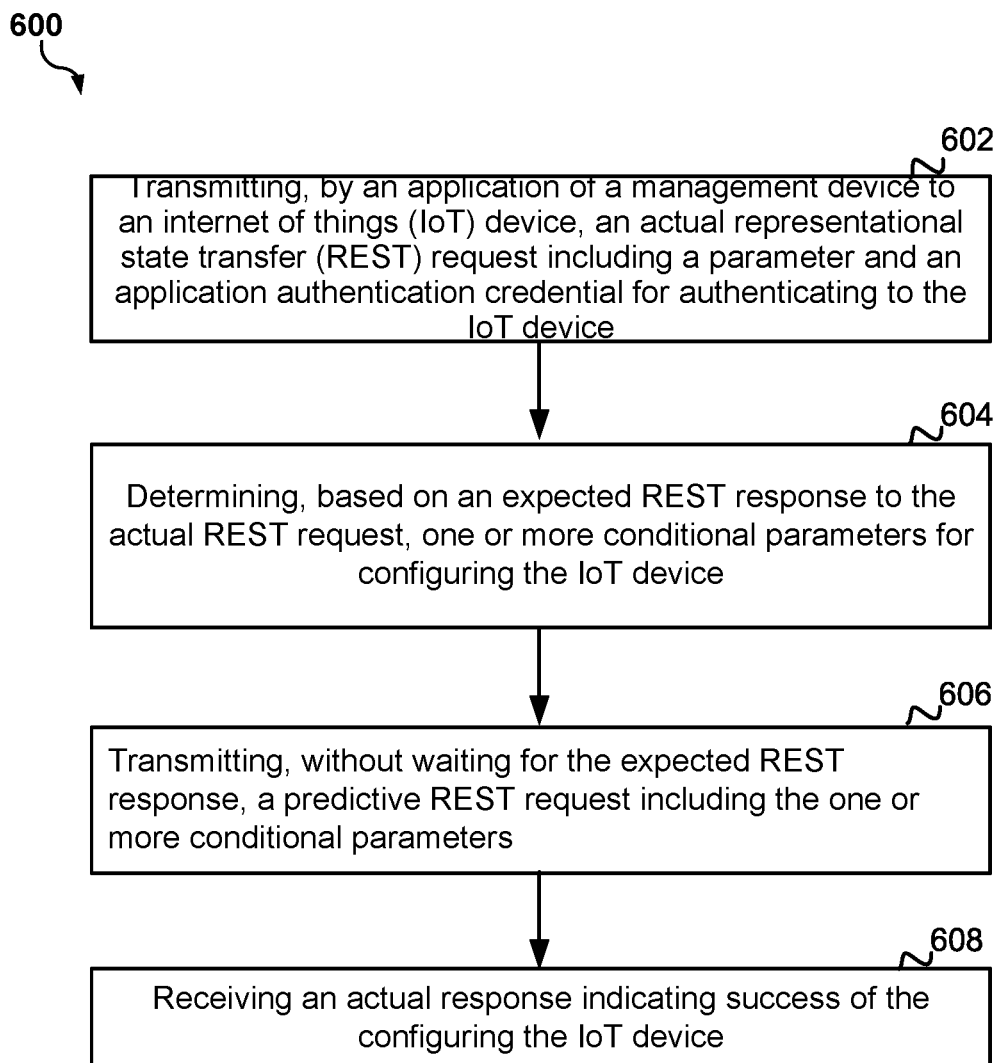
FIG. 6 is a flow diagram of an example method of employing predictive requests for secure low-latency and low-throughput support of REST APIs in IoT devices, according to some implementations.

Referring to FIG. 6, in operation, the management device 106 or computing device 700 may perform an example method 600 for employing predictive requests for secure low-latency and low-throughput support of REST APIs in IoT devices. The method 600 may be performed by one or more components of the management device 106, the computing device 700, or any device/component described herein according to the techniques described with reference to FIGS. 1-3 and 4A-4C.

At block 602, the method 600 includes transmitting, by an application of a management device to an IoT device, an actual REST request including a parameter and an application authentication credential for authenticating to the IoT device. For instance, the application component 126 may transmit a first REST request 148(1) to the IoT device 102. In some aspects, the first REST request 148(1) may include a request parameter and a signed certificate 130. As an example, a first REST request 148(1) may include a parameter indicating that the application component 126 is requesting the RTC protocols supported by the IoT device 102. Accordingly, the management device 106 or the processor 702 executing the REST service 152 may provide means for transmitting, by an application of a management device to an IoT device, an actual REST request including a parameter and an application authentication credential for authenticating to the IoT device.

At block 604, the method 600 includes determining, based on an expected REST response to the actual REST request, one or more conditional parameters for configuring the IoT device. For instance, the application component 126 may determine conditional parameters for a second REST request 148(2). In some aspects, the REST service 152 may determine the conditional parameters by minimizing the set of available parameter options. In some aspects, the REST service 152 may minimize the set of available parameters excluding parameters corresponding to features and/or functionalities that are incompatible with the IoT device 102 and/or the management device 106. For example, if an expected response queries for the selection of a protocol, the REST service 152 the conditional parameters may be derived from the protocols implemented by the IoT device 102. In some aspects, the REST service 152 may determine the conditional parameters based on historic information and/or one or more machine learning models.

As an example, the REST service 152 may determine that the IoT device and the management device 106 should both support RTP, CoAP, and MQTT. Further, the REST service may determine a preferred port and rate for each protocol. For example, a first conditional parameter may request use of real-time protocol (RTP) as the RTC protocol via port 5100 with a 64 Kbps rate, a second conditional parameter may request CoAP as the RTC protocol via port 5210 with a 20 Kbps rate, and a third conditional parameter may request use of MQTT as the RTC protocol via port 5140 with a 30 Kbps rate.

Accordingly, the management device 106 or the processor 702 executing the REST service 152 may provide means for determining, based on an expected REST response to the actual REST request, one or more conditional parameters for configuring the IoT device.

At block 606, the method 600 includes transmitting, without waiting for the expected REST response, a predictive REST request including the one or more conditional parameters. For instance, the REST service 152 may send the second REST request prior to receipt of a REST response 150(1) to the first REST request 148(1). In some aspects, the REST service 152 may employ hypertext transfer protocol (HTTP) pipelining to transmit the first and second REST requests 148(1)-(2) together, thereby reducing overall network throughput and improving channel use efficiency, as the number of individual request transmitted to the IoT device 102. Accordingly, the management device 106 or the processor 702 executing the REST service 152 may provide means for transmitting, without waiting for the expected REST response, a predictive REST request including the one or more conditional parameters.

At block 608, the method 600 includes receiving an actual response indicating success of the configuring the IoT device. For instance, the REST service 152 may receive the REST response 150(2) indicating that the IoT device 102 was able to process one of the conditional parameters. For example, the REST service 152 may receive the REST response 150(2) indicating that the IoT device 102 has been configured to employ one of RTP, CoAP, or MTQQ in communications with the management device 106. Accordingly, the management device 106 or the processor 702 executing the REST service 152 may provide means receiving an actual response indicating success of the configuring the IoT device.

In an alternative or additional aspect, in order to transmit the predictive REST request including the one or more conditional parameters, the method 600 comprises transmitting the predictive REST request including a conditional parameter operator identifying the one or more conditional parameters. Accordingly, the management device 106 or the processor 702 executing the REST service 152 may provide means for transmitting the predictive REST request including a conditional parameter operator identifying the one or more conditional parameters. In an alternative or additional aspect, the actual REST request is a first actual REST, the expected response is a first expected REST response, the predictive REST request is a first predictive REST request, the one or more conditional parameters are one or more first conditional parameters, and the method 600 comprises transmitting, by the application to the IoT device, a second actual REST request including a parameter, determining, based on a second expected REST response to the second actual REST request, one or more second conditional parameters for configuring the IoT device, transmitting, without waiting for the second expected REST response, a second predictive REST request including the one or more conditional parameters, receiving the second expected response indicating failure of the configuring the IoT device via the one or more second conditional parameters, determine a third parameter based on the second expected response; and transmit, to the IoT device, a third actual REST request including the second parameter. Accordingly, as described with respect to FIG. 4C, the management device 106 or the processor 702 executing the REST service 152 may provide means for transmitting, by the application to the IoT device, a second actual REST request including a parameter, determining, based on a second expected REST response to the second actual REST request, one or more second conditional parameters for configuring the IoT device, transmitting, without waiting for the second expected REST response, a second predictive REST request including the one or more conditional parameters, receiving the second expected response indicating failure of the configuring the IoT device via the one or more second conditional parameters, determine a third parameter based on the second expected response, and transmit, to the IoT device, a third actual REST request including the second parameter.

In an alternative or additional aspect, in order to transmit the actual REST request and transmit the predictive REST request comprises, and the method 600 comprises HTTP pipelining the actual REST request and the predictive REST request. Accordingly, the management device 106 or the processor 702 executing the REST service 152 may provide means for HTTP pipelining the actual REST request and the predictive REST request. In an alternative or additional aspect, in order to determine the one or more conditional parameters for configuring the IoT device, the method 600 comprises determining the one or more conditional parameters based on a historic information associated with the IoT device and/or the application. Accordingly, the management device 106 or the processor 702 executing the REST service 152 may provide means for determining the one or more conditional parameters based on a historic information associated with the IoT device and/or the application.

In an alternative or additional aspect, in order to determine the one or more conditional parameters for configuring the IoT device, and the method 600 determining the one or more conditional parameters based on a machine learning model. Accordingly, the management device 106 or the processor 702 executing the REST service 152 may provide means for determining the one or more conditional parameters based on a machine learning model. In an alternative or additional aspect, in order to transmit the predictive REST request including the one or more conditional parameters, and the method 600 comprises transmitting a parameter for configuring RTP communications between the application and the IoT device. Accordingly, the management device 106 or the processor 702 executing the REST service 152 may provide means for transmitting a parameter for configuring RTP communications between the application and the IoT device.

In an alternative or additional aspect, in order to transmit the predictive REST request including the one or more conditional parameters, the method 600 comprises transmitting a parameter for configuring a number of levels for alarm generation and/or threshold values for the alarm generation. Accordingly, the management device 106 or the processor 702 executing the REST service 152 may provide means for transmitting a parameter for configuring a number of levels for alarm generation and/or threshold values for the alarm generation. In an alternative or additional aspect, in order transmit the predictive REST request including the one or more conditional parameters, the method 600 comprises transmitting a parameter for configuring a type of sensor functionality of the IoT device. Accordingly, the management device 106 or the processor 702 executing the REST service 152 may provide means for transmitting a parameter for configuring a type of sensor functionality of the IoT device. In an alternative or additional aspect, in order transmit the predictive REST request including the one or more conditional parameters, the method 600 comprises transmitting a parameter for configuring a logging level of the IoT device. Accordingly, the management device 106 or the processor 702 executing the REST service 152 may provide means for transmitting a parameter for configuring a logging level of the IoT device.

Figure 7:
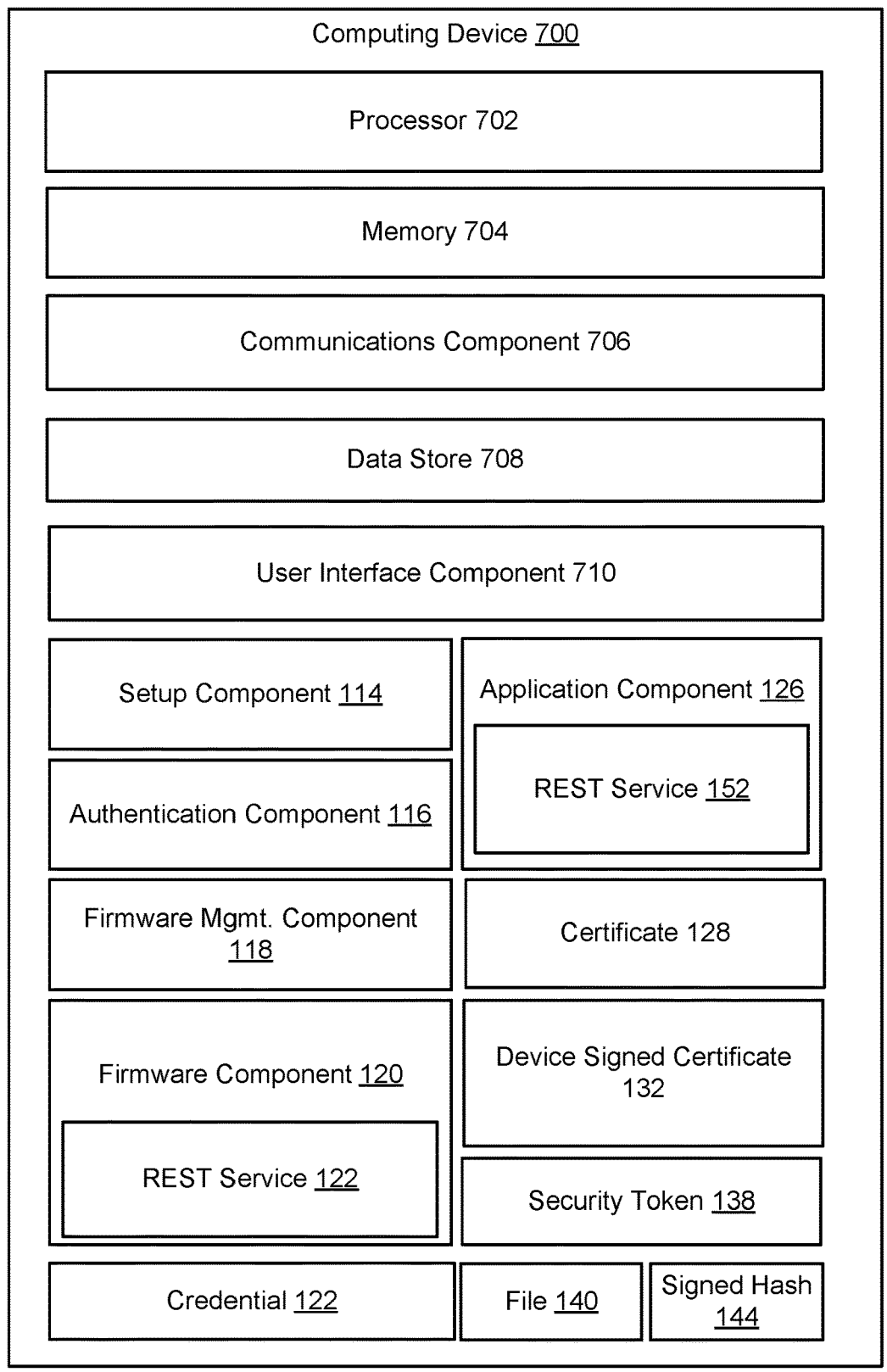
FIG. 7 is block diagram of an example of a computer device configured to implement secure low-latency and low-throughput support of REST APIs in IoT devices, according to some implementations.

Referring to FIG. 7, a computing device 700 may implement all or a portion of the functionality described herein. The computing device 700 may be or may include or may be configured to implement the functionality of at least a portion of the system 100, or any component therein. For example, the computing device 700 may be or may include or may be configured to implement the functionality of the IoT devices 102, the management devices 106, and the client devices 108. The computing device 700 includes a processor 702 which may be configured to execute or implement software, hardware, and/or firmware modules that perform any functionality described herein. For example, the processor 702 may be configured to execute or implement software, hardware, and/or firmware modules that perform any functionality described herein with reference to the IoT device 102, the management device 106, the client device 108, or any other component/system/device described herein.

The processor 702 may be a micro-controller, an application-specific integrated circuit (ASIC), a digital signal processor (DSP), or a field-programmable gate array (FPGA), and/or may include a single or multiple set of processors or multi-core processors. Moreover, the processor 702 may be implemented as an integrated processing system and/or a distributed processing system. The computing device 700 may further include a memory 704, such as for storing local versions of applications being executed by the processor 702, related instructions, parameters, etc. The memory 704 may include a type of memory usable by a computer, such as random access memory (RAM), read only memory (ROM), tapes, magnetic discs, optical discs, volatile memory, non-volatile memory, and any combination thereof. Additionally, the processor 702 and the memory 704 may include and execute an operating system executing on the processor 702, one or more applications, display drivers, and/or other components of the computing device 700.

Further, the computing device 700 may include a communications component 706 that provides for establishing and maintaining communications with one or more other devices, parties, entities, etc. utilizing hardware, software, and services. The communications component 706 may carry communications between components on the computing device 700, as well as between the computing device 700 and external devices, such as devices located across a communications network and/or devices serially or locally connected to the computing device 700. In an aspect, for example, the communications component 706 may include one or more buses, and may further include transmit chain components and receive chain components associated with a wireless or wired transmitter and receiver, respectively, operable for interfacing with external devices.

Additionally, the computing device 700 may include a data store 708, which can be any suitable combination of hardware and/or software, that provides for mass storage of information, databases, and programs. For example, the data store 708 may be or may include a data repository for applications and/or related parameters not currently being executed by processor 702. In addition, the data store 708 may be a data repository for an operating system, application, display driver, etc., executing on the processor 702, and/or one or more other components of the computing device 700.

The computing device 700 may also include a user interface component 710 operable to receive inputs from a user of the computing device 700 and further operable to generate outputs for presentation to the user (e.g., via a display interface to a display device). The user interface component 710 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 710 may include one or more output devices, including but not limited to a display interface, a speaker, a haptic feedback mechanism, a printer, any other mechanism capable of presenting an output to a user, or any combination thereof.

What is claimed is:

1. A method performed by an internet of things (IoT) device, the method comprising:

establishing a first encrypted communication channel with an application of a management device;

receiving, from the application via the first encrypted communication channel, a certificate signing request including a public key of the application;

signing, using read-only birth secret information of the IoT device, the public key of the application to generate a first signed certificate;

transmitting, to the application via the first encrypted communication channel, the first signed certificate in response to the certificate signing request;

receiving, via a second encrypted communication channel, an authentication request including a second signed certificate;

determining, via the read-only birth secret information, that the second signed certificate matches the first signed certificate; and transmitting an application credential to the application via the second encrypted communication channel.

2. The method of claim 1, wherein establishing the first encrypted communication channel with the application comprises:

establishing, via mutual authentication with the application, the first encrypted communication channel as a transport layer security (TLS) session.

3. The method of claim 1, wherein the read-only birth secret information includes an IoT device private key, and signing the public key of the application to generate the first signed certificate comprises signing the public key of the application using the IoT device private key.

4. The method of claim 3, wherein the read-only birth secret information includes an IoT device public key, and determining that the second signed certificate matches the first signed certificate comprises:

verifying the second signed certificate using the IoT device public key.

5. The method of claim 1, wherein the application credential includes a session token, and transmitting the application credential to the application comprises:

transmitting, to the application via the second encrypted communication channel, the session token for a representational state transfer (REST) session between the application and the IoT device.

6. The method of claim 5, wherein receiving the certificate signing request including the public key of the application comprises receiving a REST request with the public key of the application transmitted as a REST parameter encoded as a multiple type-length-value attribute.

7. The method of claim 5, wherein transmitting the first signed certificate comprises transmitting a REST response with the first signed certificate as an encoded REST parameter in a privacy enhanced mail format.

8. The method of claim 1, further comprising:

establishing a third encrypted communication channel with the application;

receiving, via the third encrypted communication channel from a web browser[ ], a hash of a first application file;

signing, using the read-only birth secret information of the IoT device, the hash of the first application file to generate a first signed hash;

transmitting the first signed hash to the application via the third encrypted communication channel;

establishing a fourth encrypted communication channel with the web browser;

receiving an execution request including a second application file and a second signed hash; and executing, based on the first signed hash matching the second signed hash, an operation using the second application file.

9. A system comprising:
a memory storing instructions thereon; and
at least one processor coupled to the memory and configured by the instructions to:
establish a first encrypted communication channel with an application;
receive, from the application via the first encrypted communication channel, a certificate signing request including a public key of the application;
sign, using read-only birth secret information, the public key of the application to generate a first signed certificate;
transmit, to the application via the first encrypted communication channel, the first signed certificate in response to the certificate signing request;
receive, via a second encrypted communication channel, an authentication request including a second signed certificate;
determine, via the read-only birth secret information, that the second signed certificate matches the first signed certificate; and
transmit an application credential to the application via the second encrypted communication channel.

10. The system of claim 9, wherein to establish the first encrypted communication channel with the application, the at least one processor is configured by the instructions to establish, via mutual authentication with the application, the first encrypted communication channel as a transport layer security (TLS) session.

11. The system of claim 9, wherein the read-only birth secret information includes an IoT device private key, and to sign the public key of the application to generate the first signed certificate, the at least one processor is configured by the instructions to sign the public key of the application using the IoT device private key.

12. The system of claim 9, wherein the read-only birth secret information includes an IoT device private key, and to determine that the second signed certificate matches the first signed certificate, the at least one processor is configured by the instructions to verify the second signed certificate using a IoT device public key.

13. The system of claim 9, wherein the application credential include a session token, and to transmit the application credential to the application, the at least one processor is configured by the instructions to transmit, to the application via the second encrypted communication channel, the session token for a representational state transfer (REST) session with the application.

14. The system of claim 9, wherein to receive the certificate signing request including the public key of the application, the at least one processor is configured by the instructions to receive a representational state transfer (REST) request with the public key of the application transmitted as a REST parameter encoded as a multiple type-length-value attribute.

15. The system of claim 9, wherein to transmit the first signed certificate, the at least one processor is configured by the instructions to transmit a representational state transfer (REST) response with the first signed certificate as an encoded REST parameter in a privacy enhanced mail format.

16. The system of claim 9, wherein the at least one processor is configured by the instructions to:
establish a third encrypted communication channel with the application;
receive, via the third encrypted communication channel from a web browser, a hash of a first application file;
sign, using the read-only birth secret information, the hash of the first application file to generate a first signed hash;
transmit the first signed hash to the application via the third encrypted communication channel;
establish a fourth encrypted communication channel with the web browser;
receive an execution request including a second application file and a second signed hash; and
execute, based on the first signed hash matching the second signed hash, an operation using the second application file.

17. A non-transitory computer-readable device having instructions thereon that, when executed by at least one computing device, causes the at least one computing device to perform operations comprising:
establishing a first encrypted communication channel with an application of a management device;
receiving, from the application via the first encrypted communication channel, a certificate signing request including a public key of the application;
signing, using read-only birth secret information, the public key of the application to generate a first signed certificate;
transmitting, to the application via the first encrypted communication channel, the first signed certificate in response to the certificate signing request;
receiving, via a second encrypted communication channel, an authentication request including a second signed certificate;
determining, via the read-only birth secret information, that the second signed certificate matches the first signed certificate; and
transmitting an application credential to the application via the second encrypted communication channel.

18. The non-transitory computer-readable device of claim 17, wherein the read-only birth secret information includes an IoT device private key, and signing the public key of the application to generate the first signed certificate comprises signing the public key of the application using the IoT device private key.

19. The non-transitory computer-readable device of claim 17, wherein the read-only birth secret information includes an IoT device public key, and determining that the second signed certificate matches the first signed certificate comprises verifying the second signed certificate using the IoT device public key.

20. The non-transitory computer-readable device of claim 17, wherein the application credential includes a session token, and transmitting the application credential to the application comprises:
transmitting, to the application via the second encrypted communication channel, the session token for a representational state transfer (REST) session between the application and the at least one computing device.

* * * * *